United States Patent [19]

Dieter

[11] 4,385,540

[45] May 31, 1983

[54] APPARATUS FOR SCORING GLASS SHEETS

[76] Inventor: William J. Dieter, 25 W 330 Hobson, Naperville, Ill. 60540

[21] Appl. No.: 257,520

[22] Filed: Apr. 27, 1981

[51] Int. Cl.³ ........................ C03B 33/02; B26D 3/08
[52] U.S. Cl. ........................................ 83/886; 83/436; 83/448; 83/522; 83/700
[58] Field of Search ................ 83/886, 879, 880, 881, 83/436, 85, 522, 448, 698, 699, 700; 33/32 E; 225/2, 96.5, 96

[56] References Cited

U.S. PATENT DOCUMENTS

| | | | |
|---|---|---|---|
| 223,475 | 1/1880 | Brombacher | 83/886 |
| 907,674 | 12/1908 | Bird | 83/886 |
| 1,033,411 | 7/1912 | Jones | 83/886 |
| 1,059,200 | 4/1913 | Parkinson et al. | 83/886 X |
| 2,078,386 | 4/1937 | Kendis | 33/32 E |
| 3,668,956 | 6/1972 | Whipple et al. | 83/881 |
| 3,927,587 | 12/1975 | Jackson et al. | 83/881 |
| 4,083,274 | 4/1978 | Insolio et al. | 83/886 |
| 4,120,220 | 10/1978 | Mullen | 83/886 |
| 4,222,300 | 9/1980 | El-Habr | 83/886 |

Primary Examiner—Frank T. Yost
Attorney, Agent, or Firm—Mason, Kolehmainen, Rathburn & Wyss

[57] ABSTRACT

Apparatus for scoring glass sheets comprises a rotary drive roll having a tire of resilient material for drivingly engaging the underside of a sheet of glass to be cut. A scoring wheel is mounted above the drive roll and is adjustable to move toward and away from a glass sheet for scoring the upper surface of the glass as the sheet is driven underneath by the drive roll. An adjusting element, is provided for supporting and adjusting the position of the scoring wheel relative to the drive roll to maintain a selected scoring depth or as selected for the particular thickness of the glass sheet. Sheets of glass are manually guided and directed between the drive roll and the scoring wheel so that a nonlinear or curved score may be made on the glass surface. In addition, an adjustable guide is provided so that a linear score may be made at a selected distance from one edge of the glass sheet. The rotary drive roll is activated and controlled by a foot pedal which controls an electric motor that is mechanically connected to drive the roll.

14 Claims, 4 Drawing Figures

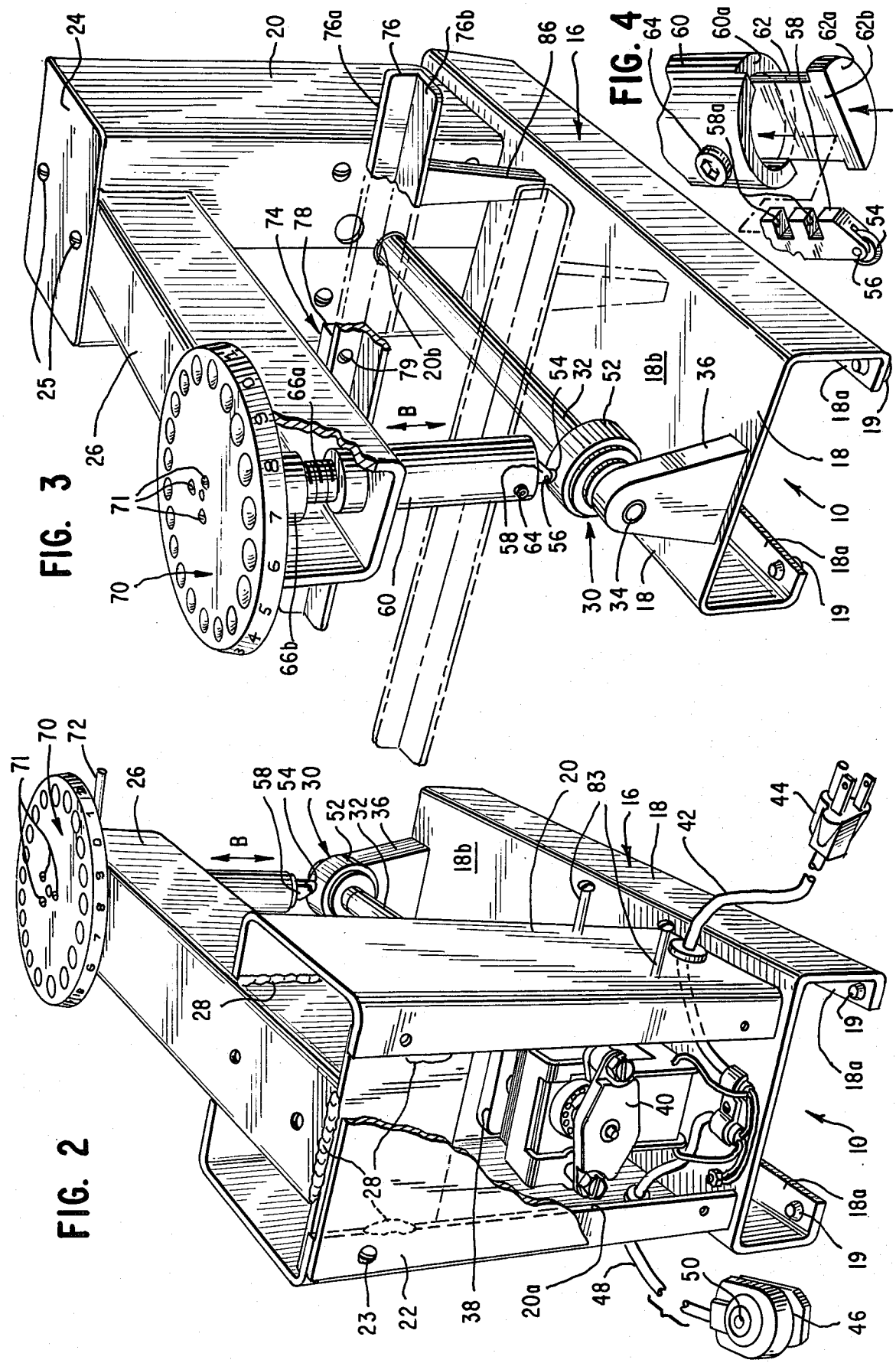

APPARATUS FOR SCORING GLASS SHEETS

BACKGROUND OF THE INVENTION

1. Field of the Invention

The present invention relates to a new and improved apparatus for scoring glass sheets and more particularly, relates to a power driven scoring apparatus similar in appearance to a sewing machine wherein the operator manipulates the direction of movement a glass sheet which is fed between a powered drive roll and a scoring wheel for scoring the upper surface of the glass.

2. Description of the Prior Art

Hand held glass cutters having a rotary scoring wheel at the lower end are in common usage for scoring glass sheets. After scoring, the sheets are broken along the score line by hand. This action requires a certain amount of strength and skill and in many instances the depth of the score is not uniform resulting in breakage occurring away from the score line in an unwanted area.

U.S. Pat. Nos. 3,280,676; 3,282,140; 3,399,586; 4,027,562; and 4,204,445 disclose various mechanical apparatus for cutting and scoring glass. These devices are primarily designed for cutting linear score lines in continuous glass webs as produced in a commercial glass making facility.

OBJECTS OF THE INVENTION

It is an object of the present invention to provide a new and improved apparatus for scoring glass sheets and more particularly an apparatus of the character described which is suitable for making irregular and or curved score lines in a glass sheet as well as linear or straight score lines.

More particularly, it is an object of the present invention to provide a new and improved apparatus for scoring glass wherein a glass sheet is guided and directed manually between a power driven, operator-controlled, rotary drive roll and an upper scoring wheel which scores the glass on the upper surface of the sheets. By manipulation of the glass the operator may provide either a linear score line or a curved or irregular score line.

Another object of the present invention is to provide a new and improved glass scoring apparatus of the character described which is somewhat similar in appearance to a sewing machine and which greatly facilitates a scoring of the glass to a uniform depth along a desired line or pattern as controlled by manipulation of the glass by an operator.

Still another object of the present invention is to provide a new and improved apparatus for scoring glass sheets of the character described wherein a selected scoring depth may be selected and then repeated as long as desired for subsequent glass sheets that are cut.

Yet another object of the present invention is to provide a new and improved glass scoring apparatus of the character described wherein the path of the glass movement beneath a scoring wheel is manually controllable and wherein the feed rate and the depth of the score is selectively controllable by an operator.

Yet another object of the present invention is to provide a new and improved apparatus for scoring glass sheets which is particularly well suited for use by unskilled persons when making stained glass light fixtures, hobby glass items or other craft items which employ pieces of colored or clear sheet glass of irregular shape or a particular artistic shape.

Yet another object of the present invention is to provide a new and improved glass scoring apparatus which permits accurate cutting of glass sheets with very little unwanted breakage resulting and which permits a relatively unskilled operator to produce objects formed of glass sheets of irregular shapes and dimensions.

Still another object of the present invention is to provide a new and improved glass scoring apparatus of the character described which is relatively lower in cost, simple in operation and easy to use, yet one which produces high quality results even with an unskilled operator utilizing the apparatus.

Still another object of the present invention is to provide a new and improved glass scoring apparatus which is capable of handling different thicknesses of sheet glass which is capable of providing a repeatable selectively controlled depth of score, and which has a novel system for replacing reinstalling a scoring wheel.

SUMMARY OF THE INVENTION

The foregoing and other objects and advantages of the present invention are accomplished in a new and improved apparatus for scoring glass sheets constructed in accordance with the features of the present invention and which includes a rotary drive roll having a tire of resilient material for drivingly engaging the underside of a hand guided and directed sheet or piece of glass that is to be cut to a desired shape or pattern. A scoring wheel is mounted above the drive roll and is selectively adjustable toward and away from the upper surface of the glass sheet to provide a controlled depth of score in the upper surface of the glass as the sheet is fed underneath and moved by the rotating drive roll. An adjustable support element is provided for selectively adjusting and accurately maintaining the spacing or position of the scoring wheel relative to the drive roll thereby providing a selected and uniform depth of the score or cut that is made in the glass sheet moving over the drive roll. The speed of the drive roll is selectively controllable by an operator with a foot pedal and a selected depth of score may be repeated in subsequent operation as different pieces of glass are scored. Irregular or curved score lines may be readily obtained by manual guidance of the glass sheets as they move beneath the scoring wheel and an adjustable support fence is provided for supporting one edge of a glass sheet when linear cuts are desired.

BRIEF DESCRIPTION OF THE DRAWINGS

For a better understanding of the present invention, reference should be had to the following detailed description taken in conjunction with the drawings, in which:

FIG. 2 is an end elevational, perspective view of the apparatus shown with covers or portions removed to display some of the interior components thereof that are normally not seen during operation;

FIG. 3 is an opposite end elevational perspective view of the apparatus; and

FIG. 4 is an enlarged, detailed and fragmentary perspective view of a scoring wheel and support assembly constructed in accordance with the features of the present invention.

DESCRIPTION OF A PREFERRED EMBODIMENT

Figure 1:
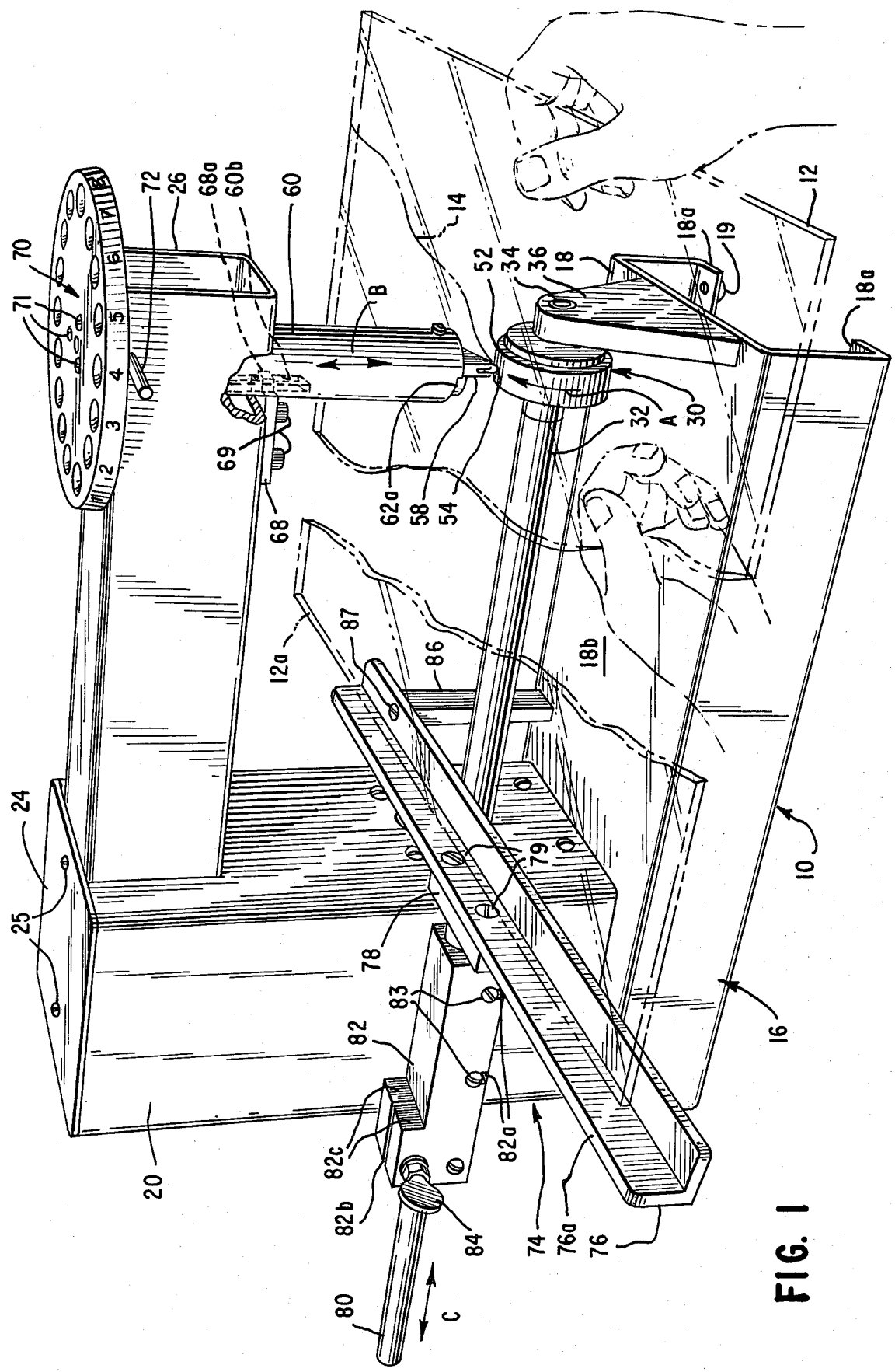
FIG. 1 is a front elevational, perspective view of a new and improved glass scoring apparatus constructed in accordance with the features of the present invention and shown in position ready for use.

Referring now more particularly to the drawings, therein is illustrated a new and improved apparatus for scoring glass sheets constructed in accordance with the features of the present invention and referred to generally by the reference numeral 10. The apparatus 10 is similar in appearance to a conventional or home type sewing machine. A work piece (in this case is a sheet of glass 12) is manually fed into the machine from the front side thereof in a horizontal plane and is manually guided and directed in order to form a cut or score along a pattern or line 14 (FIG. 1) on the upper surface of a sheet of glass.

The apparatus includes a frame 16 preferably formed of metal and including a horizontal base 18 having a channel-shaped cross-section with a pair of opposite lower edge flanges 18a provided with resilient bumpers or feet 19 at opposite ends for supporting the apparatus on a table top or other convenient working surface. At the left-hand end of the frame (as viewed in FIG. 1) there is provided an upstanding, hollow leg 20 having a generally rectangular-shaped, transverse cross-section, and formed with a large access opening 20a in an outer side wall and having an open upper end as shown in FIG. 2. A removable side cover plate 22 normally held in place by cap screws 23 threaded into wall segments of the leg 20 adjacent the opening 20a is provided and, similarly, a removable top cover 24 is secured in place with cap screws 25 to close the upper end of the leg structure 20. The frame further includes an outwardly extending horizontal arm 26 preferably formed of hollow, square or rectangular metal tubing and extending outwardly from an upper end portion of the leg 20 and spaced above and parallel to a horizontal web portion 18b of the base. The base, leg and arm segments of the frame 16 are interconnected and secured together to form an integral structure with suitable fastening means such as by welding 28 and the resulting structure is strong, sturdy and relatively light in weight generally similar in appearance to the frame of a conventional domestic sewing machine.

In accordance with the present invention, the glass scoring apparatus includes a power driven, glass engaging, drive roll 30 mounted adjacent an outer end portion of a horizontal drive shaft or arbor 32 which is supported at its outer end in a bearing 34 mounted in a pillow block structure 36 extending upwardly from the web 18b of the base at the right hand end. At the opposite (left-hand) end, the arbor shaft 32 extends into the hollow interior of the lower portion of the leg structure 20 through an opening 20b in the inside wall. The arbor 32 is coupled to the output shaft of a gear reducer 38 driven by an electrical motor 40 and the motor and reducer is mounted within the lower portion of the hollow leg structure 20.

The electric motor 40 is adapted to be supplied with household current through a line cord 42 and plug 44 adapted to be plugged into a convenience outlet. The motor is controlled by means of a foot pedal type control unit 46 connected by a flexible line cord 48 extending into the lower end portion of the upstanding leg 20 of the frame. The foot pedal control unit 46 is adapted to rest at a suitable location on a floor or other work surface and includes a pivotably movable pedal 50 which is depressed downwardly to energize the motor to drive the roll 30. When the pedal is released, the motor stops immediately thus providing for a more precise control of the scoring action. The motor is a brake type motor to insure rapid stopping of the rotor when deenergized.

As illustrated in FIG. 1, the drive roll 30 is driven to rotate in the direction shown (represented by the arrow "A") and the roll includes an annular tire 52 formed of resilient material such as rubber or resinous plastic. The tire is relatively hard but has resiliency for firmly engaging and moving the undersurface of a sheet of glass 12 to be cut. The resiliency of the tire material is chosen so as to provide accommodations for minor variations in thickness of the glass and at the same time still provide positive frictional driving engagement with the undersurface of the glass sheets 12.

In accordance with the present invention, the upper surface of a glass sheet 12 is fed into the apparatus and is scored by means of a hardened cutter wheel 54 formed of carbide or other suitable tooling material. The cutter wheel is rotatable on a small axle or shaft 56 extending transversely between the depending legs of a fork on the lower end of a conventional glass cutter 58. As best shown in FIG. 4, opposite sides of the glass cutter are flat and parallel and one edge is formed with notches 58a. The glass cutter is mounted in the hollow bore of a vertically extending, cyclindrically-shaped mandrel 60 which is supported against the outer end of the frame arm 26 for controlled, vertical movement toward and away from the glass drive roll 30.

The lower end of the mandrel 60 is open and is notched out to form a shoulder 60a for accommodating a flange 62a formed on the lower end of a backing member 62 having a shank of semi-circular transverse cross-section projecting upwardly into the hollow bore of the mandrel. One of the flat faces of the glass cutter 58 is seated against a diametrically disposed, flat face 62b on the shank of the backing member 62. A socket, type set screw 64 is mounted in the opposite wall of the mandrel 60 to firmly secure the glass cutter 58 against the flat face 62b of the backing member and accurately align the glass cutter scoring wheel 54 with respect to a center axis of the mandrel 60.

When the set screw is removed, the glass cutter 58 and the backing member 62 may be extracted downwardly from the bore of the mandrel and a new glass cutter may be installed in its place and tightly secured and accurately aligned by merely tightening the set screw 64. Should the scoring wheel 54 of a glass cutter become dull or damaged, it is readily replaceable in the manner described.

The inner end portion of the set screw 64 is frustoconical in shape and engages the edges of one of the notches 58a in the glass cutter body to firmly position and center the scoring wheel 54 on the center axis of the mandrel parallel of the flat surface 62b of the backing member 62 which is at right angles to the arbor shaft 32. Precision alignment of the cutter wheel is thus achieved along with ease of replacement when necessary.

The mandrel 60 is vertically adjustable toward and away from the upper surface of the glass drive roll 30 as indicated by the double headed arrow "B" in order to achieve any desired depth of score and to accommodate different thicknesses of glass sheets 12. An upper end portion of the mandrel projects upwardly into the hollow arm 26 through a cylindrical opening in the bottom wall. An upper section of the bore of the mandrel is internally threaded to receive the depending threaded shank 66a at the lower end of a vertical adjustment screw 66.

During vertical adjustments of the mandrel 60, rotation is restrained and prevented by the engagement of a key element 68a within a longitudinal groove 60b provided in an upper portion of the mandrel wall as shown in FIG. 1. The key or tooth 68a is formed on the edge of a key plate 68 secured to the underside of the bottom wall of the arm 26 by cap screws 69.

As the mandrel 60 is moved up and down, sliding engagement between the key 68a and the slot 60b in the mandrel restricts rotation and maintains the scoring wheel 54 in precise alignment with the center of the tire 52 on the drive roll 30 even though the vertical spacing or distance between the surface of the roll and the cutter wheel is changed.

The adjustment screw 66 includes an intermediate portion 66b having a diameter larger than the threaded lower end portion 66a. An upper portion of the shank with a diameter smaller than the intermediate portion 66b projects upwardly above the arm 26 through an aperture provided in the upper wall. Intermediate portion 66b of the adjustments screw is formed with an annular shoulder on the upper surface. This surface abuts against the underside of the top wall of the arm 26 and prevents upward movement of the adjustment screw relative to the arm during rotation thereof.

A hand wheel 70 of relatively larger diameter is attached to the upper end of the adjustment screw 66 by a plurality of cap screws 71. The underside of the hand wheel is seated above the upper wall of the arm 26 and prevents any downward travel of the adjustment screw during rotation thereof once the hand wheel is attached. When the adjustment screw 66 is rotated in either direction by manipulation of the hand wheel 70, the hand wheel and the intermediate shoulder surface prevent vertical travel of the adjustment screw relative to the arm. Accordingly, whenever the hand wheel is turned, the adjustment screw 66 is effective to move the mandrel 60 up and down as indicated by the arrow "B" and thereby provide selective control for adjusting the depth of the score line made by the scoring wheel 54 on the upper surface of a glass sheet 12 passing underneath.

The hand wheel is provided a plurality of numbers at spaced intervals as illustrated around the periphery and a fixed marker pin 72 is mounted to extend outwardly from the front wall of the arm 26 to provide a convenient gauge for indexing the position of the hand wheel. The indexing action helps select and maintain a desired depth of score for a particular thickness of glass sheet. The threads on the shank portion 66a of the adjusting screw 66 are relatively fine so that after the hand wheel is manually indexed with a particular number lined up with the marker pin 72, the wheel will not readily rotate or move out of the indexed position unless and until the hand wheel is again manually rotated in one direction or the other.

When it is desired to remove a sheet of glass from the machine or stop the scoring action, the hand wheel 70 is rotated in a counterclockwise direction causing the mandrel 60 to move upwardly as indicated by the upper arrowhead "B". If a new piece of glass of the same thickness is thereafter inserted between the scoring wheel 54 and the tire 52 on the drive roll 30, the hand wheel is then rotated in a clockwise direction until the same index number is aligned with the marker pin 72. This will result in the same depth of score being repeated on the newly inserted sheet of glass that is being processed. The upper surface of the hand wheel may be provided with a plurality of circumferentially spaced, apart recesses in a ring adjacent the peripheral edge. These recesses facilitate manipulation of the hand wheel in either direction.

When it is desired to cut a sheet of glass along a straight line or in a linear cut, a removable edge guide assembly 74 may be secured in position to provide a guide fence for a straight edge 12a of a sheet of glass. The guide assembly includes a guide fence 76 having a vertical, upstanding edge guiding flange 76a, against which the edge 12a of the glass sheet is positioned. The fence includes a horizontal or bottom flange 76b for supporting the underside of a glass sheet on a plane level with the upper surface of the tire 52 on the drive roll 30. The vertical flange 76a of the guide fence is attached with cap screws 79 to a support block 78 mounted on the end of a horizontal guide rod 80. The rod is slideably disposed in a horizontal throughbore formed in a base element 82 which is removably attached to the front wall of the frame leg 20. The element 82 is attached to the wall by a pair of cap screws 83 which extend through slots 82a formed in the lower edge below the horizontal bore and are threaded into apertures provided in the front wall of the frame leg 20. When tightened, the screws secure the base block with the bore in a horizontal position as shown.

The fence support rod 80 is adjustable in a horizontal direction in the base 82 as indicated by the arrows "C" so that the spacing or distance between the vertical surface of the guide fence flange 76a and the scoring wheel 54 may be selected as desired. The base element 82 is formed with a longitudinal split or a slot 82b separating a pair of upstanding ears 82c and a thumb screw 84 having a threaded shank is extended through an aperture in the front ear 82c and the slot 82b into threaded engagement in the rearward ear 82c to provide positive clamping action for securing the guide rod 80 in a selected horizontal position. A rearward end portion of the guide fence 76 is supported above the web 18b of the base by a post 86 attached to the flange 76b by a cap screw 87. The support post helps to stabilize the end portion of the fence as a glass sheet 12 moves outwardly thereon after scoring and reduces the amount of clamping pressure needed from tightening of the thumb screw 84.

While there have been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Apparatus for scoring glass sheets comprising:
   a rotary drive roll having a tire of resilient material for drivingly engaging the underside of and supporting a sheet of glass to be cut;
   a frame and bearing means for supporting a horizontal drive shaft on which said drive roll is mounted for turning therewith, said frame including an upstanding leg at an end of said shaft opposite said drive roll and an arm extending outwardly of said leg spaced parallel to and above said shaft for supporting scoring means above said drive roll;

scoring means above said drive roll adjustable to move toward and away from said tire for scoring engagement with the upper surface of said sheet of glass when said sheet is driven to move therebeneath by rotation of said drive roll; and means for adjusting the position of said scoring means relative to said drive roll and maintaining a selected position after adjustment while said sheet of glass is being scored, said scoring means including a rotating scoring wheel mounted adjacent a lower end of a mandrel of said adjusting means, said mandrel supported for vertical movement on said arm adjacent an outer end, said mandrel of said adjusting means being mounted for vertical movement on said arm, said adjusting means including key means for preventing rotation of said mandrel relative to said arm and a hand wheel threadedly engaged with an upper end of said mandrel for moving said mandrel toward or away from said drive roll upon rotation of said hand wheel.

2. The apparatus of claim 1 including motor means for turning said drive roll at a selected RPM.

3. The apparatus of claim 2 including control means for starting and stopping said motor means.

4. The apparatus of claim 3 wherein said control means includes a foot pedal.

5. The apparatus of claim 4 wherein said motor means includes a brake type motor which stops rapidly when said foot pedal is released.

6. The apparatus of claim 2, 3 or 4 wherein said motor means includes an electric motor and a shaft driven thereby, said drive roll being mounted to turn with said shaft.

7. The apparatus of claim 1 wherein said adjusting means includes marker means for indicating the rotative position of said hand wheel.

8. The apparatus of claim 1 wherein said scoring wheel is detachably mounted on said mandrel.

9. The apparatus of claim 8 wherein said mandrel is formed with a slot in said lower end extending longitudinally upward and said scoring wheel is mounted on a support element having an upper portion extending into said slot.

10. The apparatus of claim 9 including fastener means on said mandrel movable toward and away from said support element in said slot for holding and releasing said scoring wheel from said mandrel.

11. The apparatus of claim 1 including guide means mounted on said frame in selectively adjustable positions for guiding an edge of said sheet of glass as it is scored by said scoring means.

12. The apparatus of claim 11 wherein said guide means includes a guide fence having a bottom flange for supporting the underside of said sheet of glass on a level with an upper surface of said drive roll.

13. The apparatus of claim 12 wherein said guide fence includes an upstanding flange for guiding an edge of said sheet of glass.

14. The apparatus of claim 13 including fastener means for securing said upstanding flange at a selected adjustable spacing distance from said scoring means.

* * * * *